(12) United States Patent
Chan et al.

(10) Patent No.: US 10,983,352 B2
(45) Date of Patent: Apr. 20, 2021

(54) DISPLAY SYSTEM WITH VIRTUAL IMAGE DISTANCE ADJUSTMENT AND CORRECTIVE LENSES

(71) Applicant: Apple Inc., Cupertino, CA (US)

(72) Inventors: Victoria C. Chan, Sunnyvale, CA (US); Christina G. Gambacorta, Sunnyvale, CA (US); Igor Stamenov, Manteca, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/713,877

(22) Filed: Dec. 13, 2019

(65) Prior Publication Data

US 2020/0225477 A1 Jul. 16, 2020

Related U.S. Application Data

(60) Provisional application No. 62/792,730, filed on Jan. 15, 2019.

(51) Int. Cl.
*G02B 27/01* (2006.01)
*G02B 3/10* (2006.01)
*G02C 7/08* (2006.01)

(52) U.S. Cl.
CPC ........... *G02B 27/0172* (2013.01); *G02B 3/10* (2013.01); *G02B 27/0176* (2013.01); *G02C 7/081* (2013.01); *G02B 2027/0178* (2013.01)

(58) Field of Classification Search
CPC combination set(s) only.
See application file for complete search history.

(56) References Cited

U.S. PATENT DOCUMENTS

| 5,568,207 A | 10/1996 | Chao |
| 6,027,214 A | 2/2000 | Graham |
| 6,244,705 B1 | 6/2001 | Ledbetter et al. |
| 6,496,161 B1 | 12/2002 | Tanaka |
| 7,840,444 B2 | 11/2010 | Mellon et al. |
| 9,406,253 B2 | 8/2016 | Blanche et al. |
| 10,609,363 B2 | 3/2020 | Cheng et al. |
| 2005/0099526 A1 | 5/2005 | Wu et al. |
| 2010/0271587 A1 | 10/2010 | Pavlopoulos |

(Continued)

FOREIGN PATENT DOCUMENTS

| WO | 2018138714 A1 | 8/2018 |
| WO | 2018213010 A1 | 11/2018 |

*Primary Examiner* — Deeprose Subedi
(74) *Attorney, Agent, or Firm* — Treyz Law Group, P.C.; G. Victor Treyz; Tianyi He

(57) ABSTRACT

A head-mounted device may have a display that displays computer-generated content for a user. The head-mounted device may have an optical system that directs the computer-generated image towards eye boxes for viewing by a user. The optical system may be a see-through optical system that allows the user to view a real-world object through the optical system while receiving the computer-generated image or the optical system may include a non-removable lens and a removable vision correction lens through which an opaque display is viewable. The optical system may include a removable lens. The removable lens may serve as a custom vision correction lens to correct for a user's vision defects. The optical system may have a projection bias lens that places computer-generated content at one or more desired virtual image distances and a corresponding compensation bias lens.

19 Claims, 10 Drawing Sheets

(56) References Cited

U.S. PATENT DOCUMENTS

| | | |
|---|---|---|
| 2012/0120498 A1 | 5/2012 | Harrison et al. |
| 2013/0127980 A1* | 5/2013 | Haddick ............ G02B 27/0093 348/14.08 |
| 2014/0192426 A1 | 7/2014 | Wu |
| 2016/0085300 A1* | 3/2016 | Robbins ............. G02B 27/0093 345/633 |
| 2017/0092235 A1 | 3/2017 | Osman et al. |

* cited by examiner

US 10,983,352 B2

DISPLAY SYSTEM WITH VIRTUAL IMAGE DISTANCE ADJUSTMENT AND CORRECTIVE LENSES

This application claims the benefit of provisional patent application No. 62/792,730, filed Jan. 15, 2019, which is hereby incorporated by reference herein in its entirety.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. Head-mounted devices may include optical systems with lenses. The lenses allow displays in the devices to present visual content to users.

Some users of head-mounted devices have visual defects such as myopia, hyperopia, astigmatism, or presbyopia. It can be challenging to ensure that an optical system in a head-mounted device displays computer-generated content satisfactorily and provides an acceptable viewing experience for users with visual defects. If care is not taken, it may be difficult or impossible for a user with visual defects to focus properly on content that is being displayed or content may otherwise not be displayed as desired.

SUMMARY

A head-mounted device may have a display that displays computer-generated content for a user. The head-mounted device may have an optical system that directs the computer-generated content towards eye boxes for viewing by a user.

In one illustrative configuration, the optical system may include a non-removable lens and a removable lens through which an opaque display is viewable. The removable lens may serve as a vision correction lens and may have radially increasing lens power to compensate for field curvature in the optical system.

In another illustrative configuration, the optical system may be a see-through optical system that allows the user to view a real-world object through the optical system while receiving the computer-generated image. This type of system may have a waveguide with an output coupler interposed between at least first and second lenses. The display may provide an image to the waveguide. The output coupler may couple the image from the waveguide towards the eye box through the first lens. The first lens may be a projection bias lens that adjusts virtual image distance for the image. The second lens may be a corresponding compensation bias lens that compensates for the first lens and allows the user to view the real-world object normally. If desired, the first lens or a removable third lens in the optical system may serve as a vision correction lens.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display devices for displaying visual content to a user. A lens system may be used to allow the user to focus on the display and view the visual content. To ensure that a wide range of users are able to clearly focus on the display and view visual content, the head-mounted device may receive removable supplemental lenses. The supplemental lenses may address the visual defects of users that are not otherwise addressed by the lens system. For example, a user with astigmatism may be provided with removable supplemental lenses that correct for astigmatism. When this user desires to view content with the head-mounted device, the supplemental lenses may be installed within the head-mounted device to help correct for the user's astigmatism. With one illustrative arrangement, the supplemental lenses may be coupled to the head-mounted support structures using magnets or other removable fasteners that place the supplemental lenses in alignment with non-removable lenses in the device.

Figure 1:
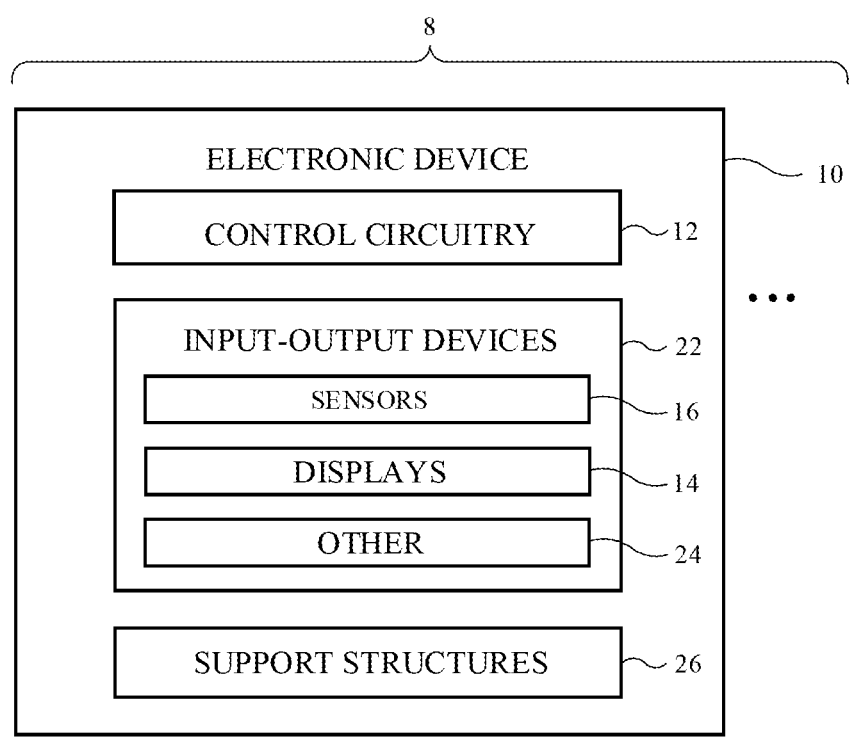
FIG. 1 is a schematic diagram of an illustrative electronic device such as a head-mounted display device in accordance with an embodiment.

A schematic diagram of an illustrative system that may use removable lenses is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively. In other configurations, display 14 includes a single display panel that extends across both eyes or uses other arrangements in which content is provided with a single pixel array.

Display 14 is used to display visual content for a user of device 10. The content that is presented on display 14 may include virtual objects and other content that is provided to display 14 by control circuitry 12 and may sometimes be referred to as computer-generated content. Computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
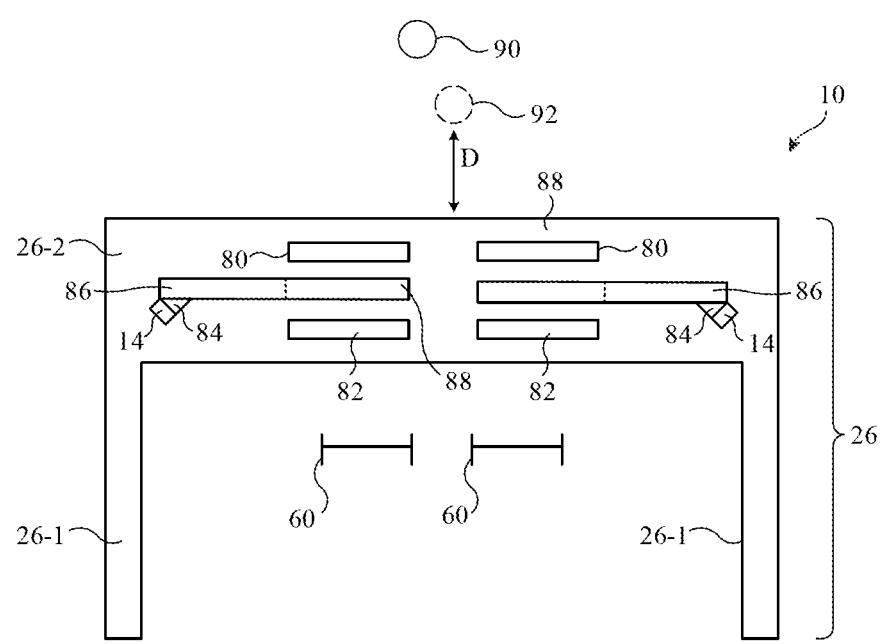
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for a main unit (e.g., support structures 26-2) and additional structures such as straps, temples, or other supplemental support structures (e.g., support structures 26-1) that help to hold the main unit and the components in the main unit on a user's face so that the user's eyes are located within eye boxes 60.

Display 14 may include left and right display portions (e.g., sometimes referred to as left and right displays, left and right display devices, left and right display components, or left and right pixel arrays). An optical system for device 10 may be formed from couplers 84 (sometimes referred to as input couplers), waveguides 86, optical couplers such as output couplers 88, and lenses 80 and 82. A user with eyes located in eye boxes 60 may view real-world objects through the optical system while viewing overlaid computer-generated content from display 14.

As shown in FIG. 2, the left portion of display 14 may be used to create an image for a left-hand eye box 60 (e.g., a location where a left-hand image is viewed by a user's left eye). The right portion of display 14 may be used to create an image for a right-hand eye box 60 (e.g., a location where a right-hand image is viewed by a user's right eye). In the configuration of FIG. 2, the left and right portions of display 14 may be formed by respective left and right display devices (e.g., digital mirror devices, liquid-crystal-on-silicon devices, scanning microelectromechanical systems mirror devices, other reflective display devices, or other displays). In arrangements in which display 14 is opaque and blocks real-world images from direct viewing by the user, display 14 may be an organic light-emitting diode display, a liquid crystal display, or other display and the optical coupler formed from waveguides 86 and output couplers 88 may be omitted.

In the see-through display arrangement of FIG. 2, optical couplers 84 (e.g., prisms, holograms, etc.) may be used to couple respective left and right images from the left and right display portions into respective left and right waveguides 86. The images may be guided within waveguides 86 in accordance with the principal of total internal reflection. In this way, the left and right images may be transported from the left and right sides of device 10 towards locations in the center of device 10 that are aligned with left and right eye boxes 60. Waveguides 86 may be provided with respective left and right output couplers 88 such as holograms formed on or in the material of waveguides 86. The left and right output couplers 88 may respectively couple the left and right images from the left and right waveguides 86 towards the left and right eye boxes 60 for viewing by the user.

Left and right lenses 80 (sometimes referred to as outer lenses, outwardly facing lenses, or compensation bias lenses) may face outwardly towards external objects such as real-world object 90 and away from eye boxes 60. Opposing corresponding left and right lenses 82 (sometimes referred to as inner lenses, inwardly facing lenses, or projection bias lenses) may face inwardly toward eye boxes 60 and away from real world objects such as object 90. The left-hand waveguide 86 and output coupler 88 may be interposed between left lens 80 and left lens 82 and the right-hand waveguide 86 and output coupler 88 may be interposed between right lens 80 and right lens 82. Lenses 80 and 82 and interposed waveguides 86 and output couplers 88 are transparent and allow real-world image light from real-world objects such as object 90 to pass to eye boxes 60 for viewing by the user. At the same time, the user can view virtual images associated with computer-generated content (left and right images) that are directed out of waveguides 86 and through lenses 82 to corresponding eye boxes 60 by output couplers 88.

The strength (sometimes referred to as the power or diopter) of lenses 82 can be selected to place virtual images such as illustrative virtual object 92 at a desired distance D from device 10. For example, it may be desirable to place computer-generated content such as text, icons, moving images, or other content at a virtual image distance D. The placement of virtual object 92 at distance D can be accomplished by appropriate selection of the strength of lenses 82. Lenses 82 may be negative lenses for users whose eyes do not have refraction errors. The strength (larger net negative power) of lenses 82 can therefore be selected to adjust distance D. For example, in a scenario in which lenses 82 are −0.5 diopter lenses, virtual object 92 may be placed at a distance D of 2 m away from device 10. As another example, if lenses 82 are −1.0 diopter lenses, virtual object 92 may be placed at a distance of 1 m from device 10.

If desired, lenses 80 may have complementary power values (e.g., positive powers with magnitudes that match the magnitudes of the negative powers of lenses 82). For example, if lenses 82 have a power of −1.0 diopter, lenses 80 may have an equal and opposite power of +1.0 diopter (as an example). In this type of arrangement, the positive power of lenses 80 cancels the negative power of lenses 82. As a result, the overall power of lenses 80 and 82 taken together will be 0 diopter. This allows a viewer to view real-world objects such as object 90 without optical influence from lenses 80 and 82. For example, a real-world object located far away from device 10 (effectively at infinity), may be viewed as if lenses 80 and 82 were not present.

For a user with satisfactory uncorrected vision, this type of complementary lens arrangement therefore allows virtual objects to be placed in close proximity to the user (e.g., at a virtual image distance D of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system. For example, a real-world object located at a distance of 2 m from device 10 (e.g., a real-world object being labeled by a virtual text label at a virtual image distance of 2 m) will optically appear to be located 2 m from device 10.

Some users may require vision correction. Vision correction may be provided using tunable lenses and/or removable lenses (sometimes referred to as supplemental lenses, vision correction lenses, removable lenses, or clip-on lenses). For example, vision correction may be provided for a user who has astigmatism by adding a removable astigmatism correction lens to the display system of FIG. 1. Other vision correction lenses may also be used, if desired. In general, the vision correction lenses may include lenses to correct for ammetropia (eyes with refractive errors) such as lenses to correct for nearsightedness (myopia), lenses to correct for farsightedness (hyperopia), and lenses to correct for astigmatism, prism lenses to correct for skewed vision, lenses to help accommodate age-related reductions in the range of accommodation exhibited by the eyes (sometimes referred to as presbyopia), and/or other vision disorders.

Figure 3:
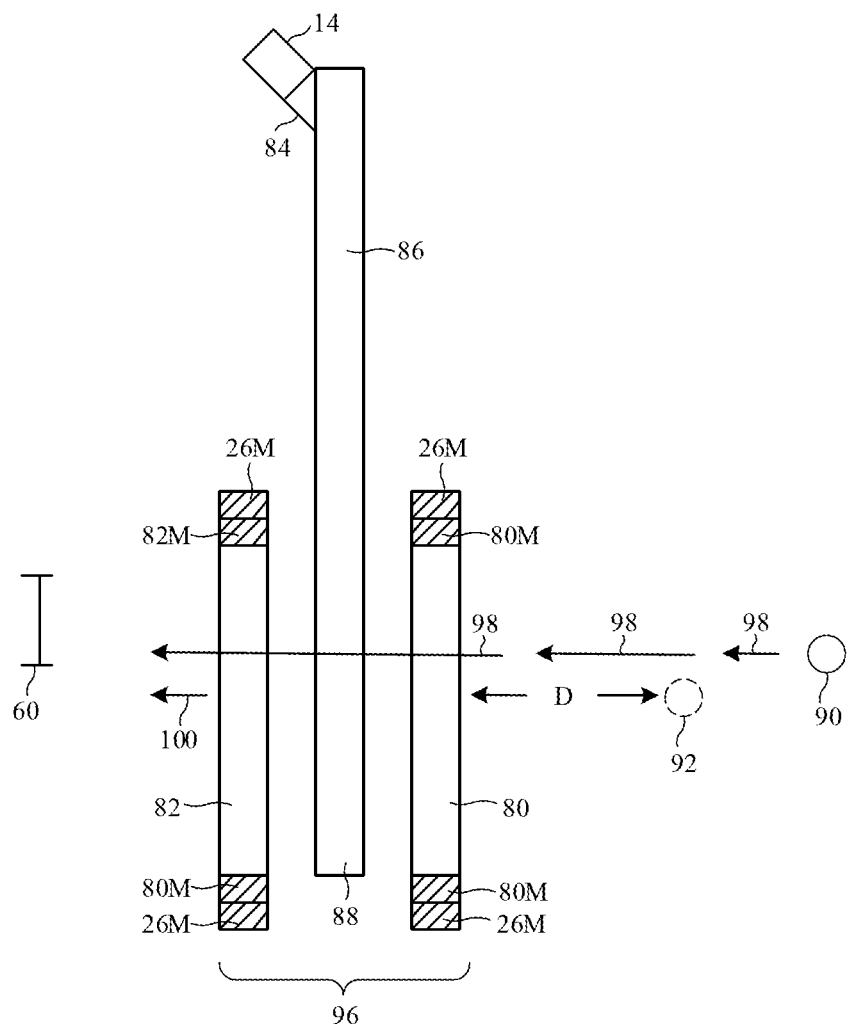
FIG. 3 is a diagram of an illustrative display and associated optical system with removable lens structures in accordance with an embodiment.

FIG. 3 is a top view of an illustrative display system for device 10. As shown in FIG. 3, display system 96 may include a portion of display 14 (e.g., a left or right display device for providing an image to a given one of the user's eyes that is located in eye box 60) and an associated optical system. The optical system may be used to route an image that is output by display 14 to eye box 60 while allowing a user to view real-world objects such as real-world object 90 that are providing a real-world image (real-world light) to eye box 60 in direction 98 through lenses 80 and 82.

The optical system may include an optical coupler such as optical coupler 84 for coupling emitted image light into waveguide 86 from a display device (e.g., display 14 of FIG. 3), output coupler 88 for coupling the image out of waveguide 86 in direction 100, and lenses. The lenses may include inner lens 82 for adjusting virtual image distance D of virtual object 92. Virtual object 92 is a visual element (sometimes referred to as a computer-generated content or computer-generated image) that is emitted by display 14, that is coupled into waveguide 86 by optical coupler 84, that is coupled out of waveguide 86 toward eye box 60 by output coupler 88, and that passes through lens 82 in direction 100 to eye box 60 for viewing by the user. The power of lens 82 may be adjusted to bring virtual object 92 closer to device 10 and the user or to place virtual object 92 at a greater distance from device 10 and the user. Lens 80 may have a complementary power (e.g., lens 80 may be a positive lens in scenarios in which lens 82 is a negative lens) or other suitable power to allow a user with an eye in eye box 60 to view real-world objects such as object 90.

To accommodate users with vision defects, one or more lenses in system 96 may be removable (and therefore customizable for each user) and/or may be tunable. Tunable lenses such as tunable liquid crystal lenses may be dynamically adjusted by control circuitry 12 (e.g., to exhibit a desired optical power that corrects the vision of a given user). Examples of lenses that may be used in system 96 (e.g., for lens 80 and/or lens 82) include fixed power lenses formed from glass, polymer, or other material (e.g., lenses that may be permanently installed in system 96 and/or that may be temporarily installed in system 96), liquid crystal lenses, liquid membrane lenses, geometric phase lenses, Fresnel lenses, zoom lenses, catadioptric lenses, single-element lenses, multi-element lenses, and/or other lenses.

Support structures 26 in device 10 may include magnets, clips, and/or other structures that mate with lenses such as illustrative lenses 80 and 82 of FIG. 3. These support structures may include permanent mounting structures (e.g., adhesive, screws, welds, etc.) that help hold lenses 80 and/or 82 permanently in place in the housing of device 10 (e.g., permanently coupled to support structures 26) and may include temporary mounting structures such as magnets that couple to corresponding temporary mounting structures on a removable lens. As shown in the example of FIG. 3, lens 80 and/or lens 82 may be removable. For example, lens 80 may have magnets 80M that mate with corresponding magnets 26M that are coupled to other support structures 26 in device 10. Lens 82 may also have magnets 82M that mate with corresponding magnets 26M.

If desired, lens 80 and/or lens 82 may be permanently attached to support structures 26. For example, lens 80 may be permanently mounted to support structure 26 and lens 82 may use magnets 82M to temporarily couple lens 82 to corresponding magnets 26M. When it is desired to customize the optical system in device 10 for a given user (e.g., a user with astigmatism), a lens 82 that corrects the given user's astigmatism may be temporarily coupled to magnets 26M and thereby temporarily installed within device 10. When a user with a different prescription (e.g., a nearsighted user with no astigmatism), a different customized lens 82 may be removably installed within system 96 to correct for that user's vision defect. Lens 82 may include both a vision correction component (e.g., a negative lens component to correct for a user's nearsightedness) and a virtual image distance adjustment component (e.g., a negative lens component to place a virtual object at a desired virtual image distance D from device 10). Lens 80 may have a power that compensates for the virtual image distance adjustment component (e.g., lens 80 may be a positive lens that is complementary to the negative lens component associated with the virtual image distance adjustment). Although shown as potentially including two lenses 80 and 82 that are fixed and/or removable, system 96 may, in general, include any suitable number of fixed lenses and/or removable lenses (e.g., at least two lenses where one lens is removable, at least two lenses where two lenses are removable, at least three lenses where one lens is removable or two lenses are removable, etc.). Lenses in system 96 may include single element lenses and/or multi-element lenses, reflective lenses, and/or other lens structures.

Figure 4:
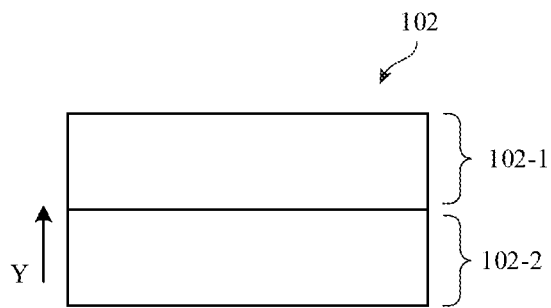
FIG. 4 is a diagram of a user's field of view showing how different portions of the field of view may be provided with virtual image content at different virtual image distances in accordance with an embodiment.
Figure 5:
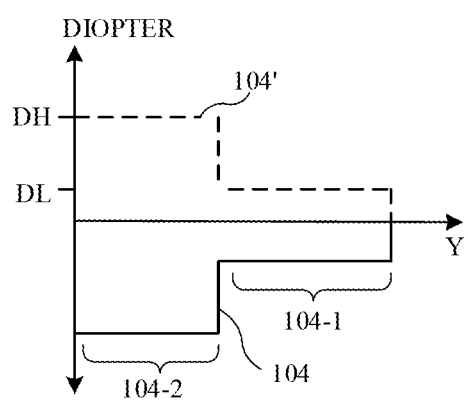
FIGS. 5, 6, and 7 are graphs showing how lens power may vary as a function of position within lenses in an optical system in accordance with embodiments.

Lenses in system 96 may include regions of different strength. For example, lens 82 may be a bifocal lens, trifocal lens, progressive lens, or other lens with multiple strengths in different regions. As an example, consider the use of a bifocal lens for implementing lens 82. The user's field of view through system 96 may be represented by the diagram of FIG. 4. As shown in FIG. 4, field of view 102 may be divided into an upper portion such as upper half 102-1 and a lower portion such as lower half 102-2. To ensure that real-world objects are viewed satisfactorily by a user with normal vision, lens 82 and lens 80 may have complementary bifocal arrangements as shown in the graph of FIG. 5, where curve 104 represents the lens power of lens 82 as a function of increasing vertical distance Y across lens 82 and where curve 104' represents the corresponding complementary lens power of lens 80 as a function of increasing vertical distance Y across lens 80. By placing complementary lenses 82 and 80 back-to-back as shown in FIG. 5, the effective lens power of the see-through optical system in system 96 will be 0 diopters (no change from unobstructed vision).

At the same time, the bifocal nature of lens 82 allows computer-generated content to be displayed at two different virtual distances D from device 10. As shown in FIG. 5, lower portion 104-2 of lens 82, which covers lower half 102-2 of field of view 102 (FIG. 4), has larger net negative power DH, whereas upper portion 104-1 of lens 82, which covers upper half 102-1 of field of view 102, has a smaller net negative power DL. With this arrangement, a virtual object in upper half 102-1 will be located at a farther virtual image distance D from device 10 than a virtual object in lower half 102-2. This allows control circuitry 12 to display virtual objects at multiple different distances D from the user.

Consider, as an example, a scenario in which the computer-generated content provided by display 14 includes text labels. Control circuitry 12 may, as an example, create a first label (e.g., "cup") for a nearby real-world object such as a cup using a virtual object in lower half 102-2 and may create a second label (e.g., "car") for a real-world object such as a car that is farther away using a virtual object in upper half 102-1. Because the virtual image distance D is smaller for the virtual object in lower half 102-2 than for the virtual object in upper half 102-1, virtual objects will appear to be at approximately the same distance from device 10 as the real-world objects that they are labeling. In this example, the virtual image distance of the label "cup" will appear to be the same as the distance to the real-world cup and the virtual image distance of the label "car" will appear to be the same as the distance to the real-world car.

Figure 6:
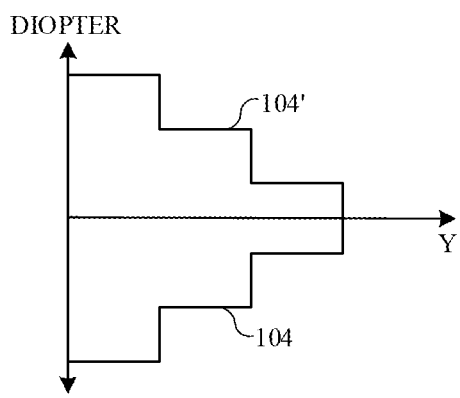

Although the example of FIGS. 4 and 5 uses two different lens power regions for lens 82 (and two complementary lens power regions for lens 80), there may be any suitable number of different regions of different powers. For example, lenses 80 and 82 may be trifocals (see, e.g., curve 104 of FIG. 6, which represents the lens power of lens 82 in a trifocal example, and curve 104' of FIG. 6, which represents the complementary lens power of lens 80) and/or may be progressive lenses (see, e.g., curve 104 of FIG. 7, which represents the lens power of lens 82 for a progressive lens example in which lens power varies monotonically and continuously without discontinuities due to steps in lens power, and curve 104' of FIG. 7, which represents the complementary lens power of lens 80). Other changes in lens power for lens 82 and for lens 80 may also be used, if desired (e.g., lateral changes across the horizontal dimension of lens 82, configurations with four or more different regions with different respective lens powers, etc.).

Lenses 80 and 82 are used in imposing a lens power bias on the field of view of the user and may therefore sometimes be referred to as bias lenses. Lens 82 serves to bias the projected computer-generated image from output coupler 88 and waveguide 86 and may therefore sometimes be referred to as a projection bias lens or projection lens, whereas lens 80 serves to provide compensating bias and may therefore sometimes be referred to as a compensation bias lens or compensation lens.

Figure 8:
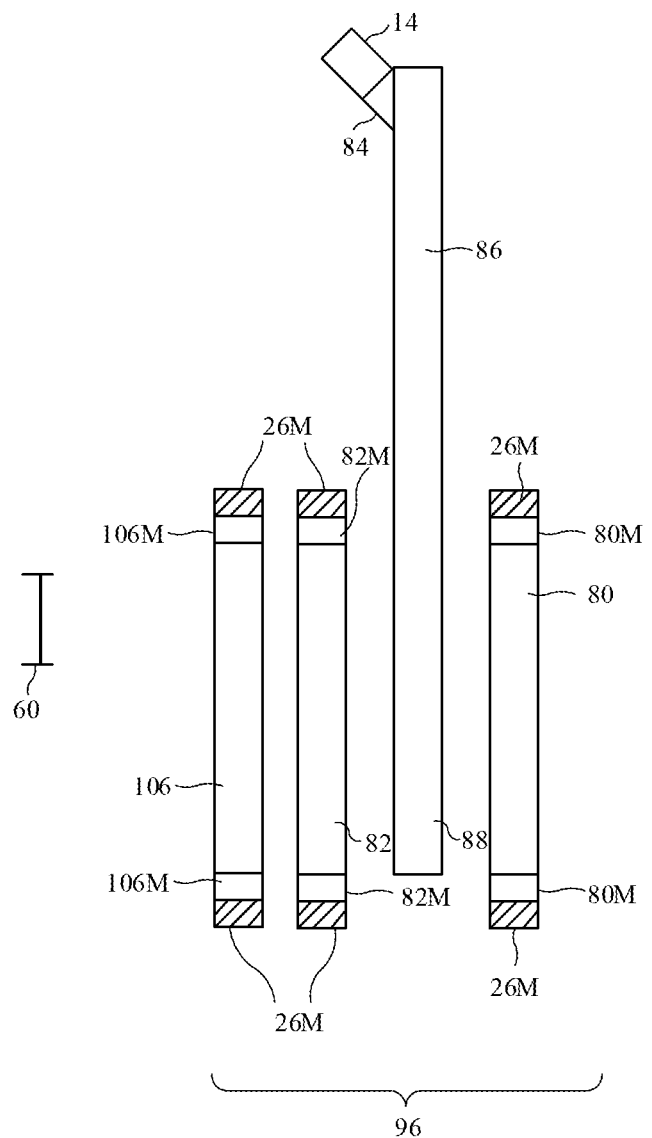
FIGS. 8, 9, and 10 are diagrams of illustrative displays and associated optical systems in accordance with embodiments.

If desired, a separate removable vision correction lens can be added to system 96. As shown in FIG. 8, for example, vision correction lens 106 may have magnets 106M or other removable lens temporary coupling structures that can be used to temporarily couple lens 106 to mating coupling structures attached to support structure 26 such as mating magnets 26M. Vision correction lens 106 may be configured to match a user's normal eyeglass prescription. For example, lens 106 may be a positive lens to correct for a user's farsightedness, a negative lens to correct for a user's nearsightedness, may be an asymmetric lens to correct for a user's astigmatism, may be a progressive lens for a user with presbyopia, etc.

Figure 9:
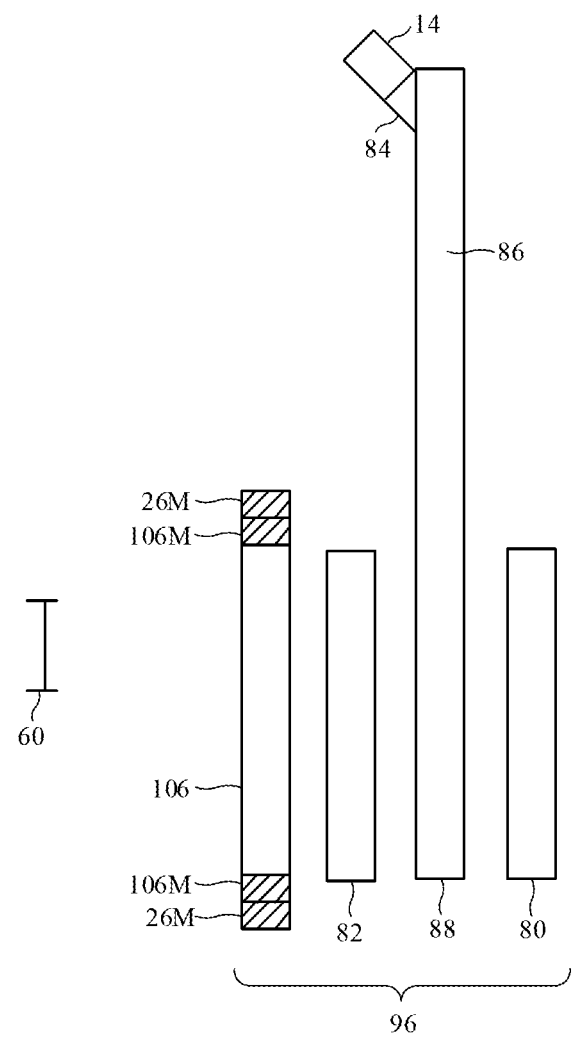

In the illustrative arrangement of FIG. 8, lens 106, lens 82, and lens 80 are removable lenses. In this type of arrangement, lens 106 may be a vision correction lens that is selected on a case-by-case bases to correct for each user's vision, as shown in FIG. 9 and lenses 80 and 82 may be replaced from time to time to adjust the virtual image distance behavior of virtual objects presented to the user. For example, in a first configuration for lenses 80 and 82, lenses 80 and 82 may have 1.5 diopter and −1.5 diopter lens powers, respectively (to place all virtual images at a given virtual image distance D from device 10). In a second configuration for lenses 80 and 82, lenses 80 and 82 are both bifocal lenses as described in connection with FIGS. 4 and 5. In a third configuration for lenses 80 and 82, lenses 80 and 82 may be trifocals. In a fourth configuration for lenses 80 and 82, lenses 80 and 82 may be complementary progressive lenses as described in connection with FIG. 7.

Figure 7:
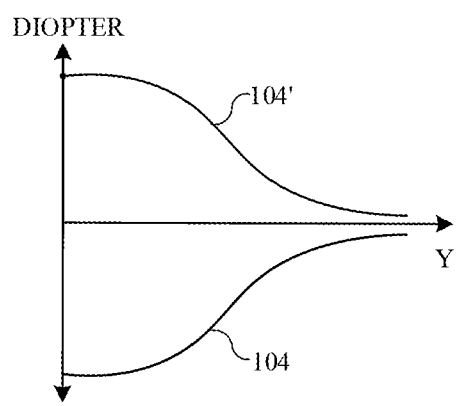

If desired, lenses 80 and 82 may be fixed lenses and lens 106 may be a removable vision correction lens, as shown in FIG. 9. This type of arrangement may simplify the construction of device 10 while still allowing a different lens 106 to be used by each different user to customize the optical properties of system 96 for each user (e.g., to correct for each different user's vision defects). Lenses 80 and 82 may have any suitable complementary configurations (e.g., single power, bifocal, trifocal, progressive, etc.). For example, lens 82 may be a progressive lens as shown in FIG. 7 and lens 80 may be a complementary progressive lens. User's with presbyopia may use progressive eyeglass prescriptions, so, if desired, vision correction lens 106 may be a progressive lens and/or may have a progressive lens power combined with an astigmatism correction lens component, and/or a nearsightedness or farsightedness correction component. In general, any suitable vision correction lens attributes may be combined into a single removable vision correction lens such as lens 106.

Figure 10:
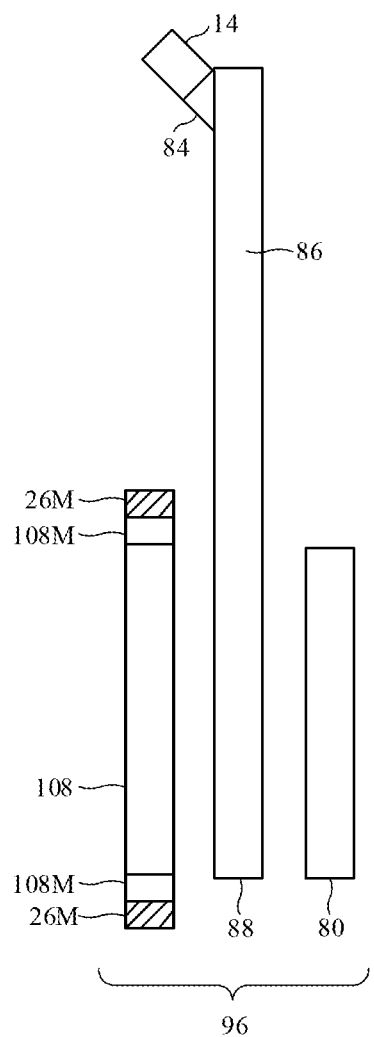

If desired, the number of lens elements in system 96 may be reduced by combining the lens properties of vision correction lens 106 into lens 82, thereby creating a combined removable lens such as lens 108 of FIG. 10 having magnets 108M or other removable lens coupling structures that mate with corresponding magnets 26M in support structure 26 of device 10. Lens 108 in this type of arrangement may incorporate all of the vision correction lens functions of lens 106 of FIG. 8 (e.g., a positive lens power component to correct for farsightedness, an asymmetric lens power component for astigmatism correction, a negative lens power component for nearsightedness correction, a progressive prescription to help with presbyopia, etc.) as well as the projection bias lens functions of lens 82 (e.g., a bifocal, trifocal, progressive, or other type of projection bias lens). Lens 80 may be configured to compensate for the lens power of the projection lens component of combined removable lens 108. Because lens 108 can serve as both a projection bias lens and as a vision correction lens, lens 108 may sometimes be referred to as a removable vision-correction-and-projection-bias lens.

If desired, the adjustability provided by making one or more of the lens elements of system 96 removable may, if desired, be implemented using tunable lens components (e.g., a tunable liquid crystal lens). Arrangements in which the lens elements can be removed and replaced with different lens elements to customize system 96 for different users may sometimes be described herein as an example.

Figure 11:
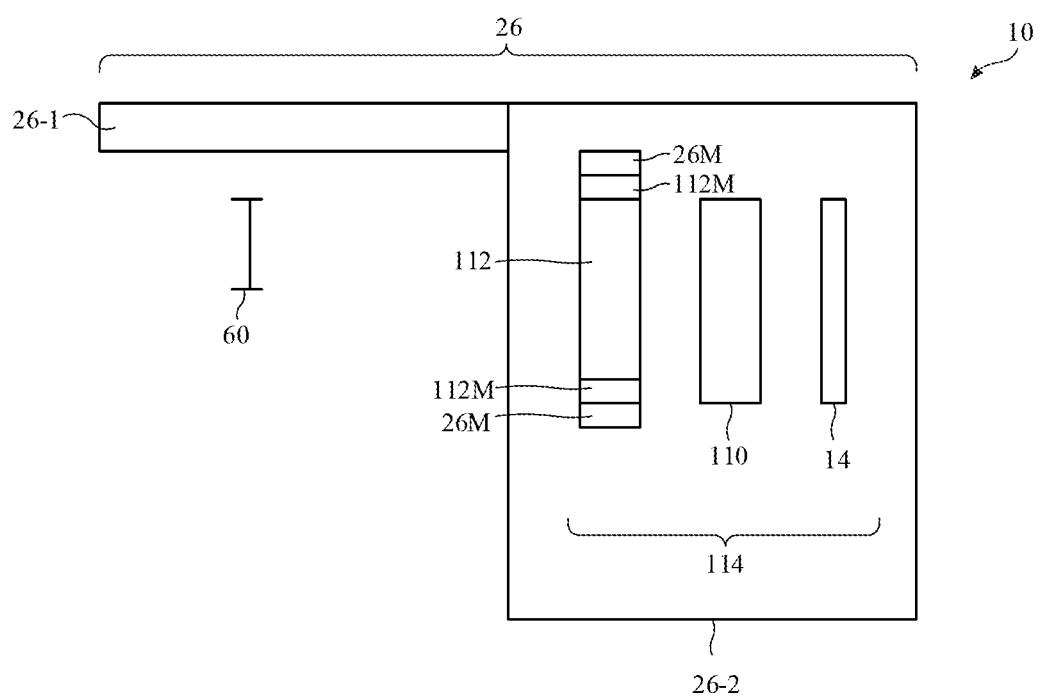
FIG. 11 is a side view of an illustrative head-mounted device with an opaque (non-see-through) display and optical system in accordance with an embodiment.

In the illustrative arrangement of FIG. 11, display 14 of device 10 is opaque. Device 10 of FIG. 11 may, if desired, include a camera to capture images of real-world content to present on display 14 or the camera may optionally be omitted. Device 10 may have support structures 26. Display system 114 may be supported by support structures 26-2 and support structures 26-1 may be used to hold device 10 on a user's head. Display system 114 may include an opaque display such as display 14 of FIG. 11 (e.g., a display that is not part of a see-through display system) for displaying a computer-generated image. Display 14 may span the user's left and right eyes or display 14 and the other components of FIG. 11 may be duplicated for the user's left and right eyes.

As shown in FIG. 11, lens 110 may be used to allow a user with an eye located in eye box 60 to view the computer-generated image. Lens 110 may be, for example, a catadioptric lens, a Fresnel lens, or other suitable lens (e.g., a non-removable fixed-power lens). To accommodate users with different eyesight characteristics, device 10 may have a removable lens such as removable vision correction lens 112. Lens 112 may be removably mounted in support structure 26 using magnets 112M that temporarily couple with corresponding magnets 26M in support structure 26.

To help improve optical performance for device 10 as a user views images on display 14, lens 112 may have a lens power component that helps compensate for field curvature (in addition to or in place of a lens power component for vision correction). In particular, lens 112 may have different regions with different optical powers. The optical power of lens 112 may, for example, increase at increasing radial distances from the center of lens 112. This type of radially progressive lens design may spatially curve the limited accommodation of a user with presbyopia to compensate for field curvature in system 114.

Figure 12:
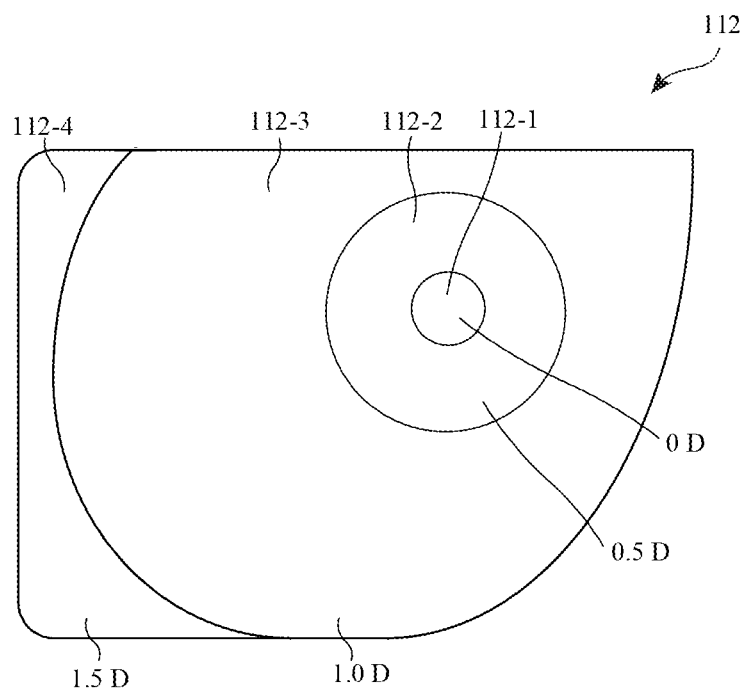
FIG. 12 is a diagram of an illustrative lens for the head-mounted device of FIG. 11 in accordance with an embodiment.

An illustrative arrangement for lens 112 is shown in FIG. 12. In the example of FIG. 12, there are four distinct regions 112-1, 112-2, 112-3, and 112-4 (e.g., three complete or truncated ring-shaped regions surrounding a circular region) each with a different corresponding lens power. This illustrative arrangement has a lens power that increments in steps, but stepless configurations (e.g., progressively increasing lens power arrangements in which lens power changes monotonically and continuously at increasing radial distances from central lens region 112-1) may be used, if desired. Central lens region 112-1 may be located in the middle of lens 112 and/or may be laterally offset (e.g., horizontally offset and shifted towards the lower portion of the user's field of view) to help lens 112 satisfactorily cover the user's vision (e.g., the center of lens region 112-1 may be offset from the geometric center of the glass member or other element forming lens 112). Vision correction lens attributes (e.g., a positive lens component to correct for farsightedness, astigmatism correction, etc.) may be incorporated into lens 112 in combination with field curvature compensation features and/or lens 112 may only serve as a vision correction lens or only as a field curvature compensation lens.

Figure 13:
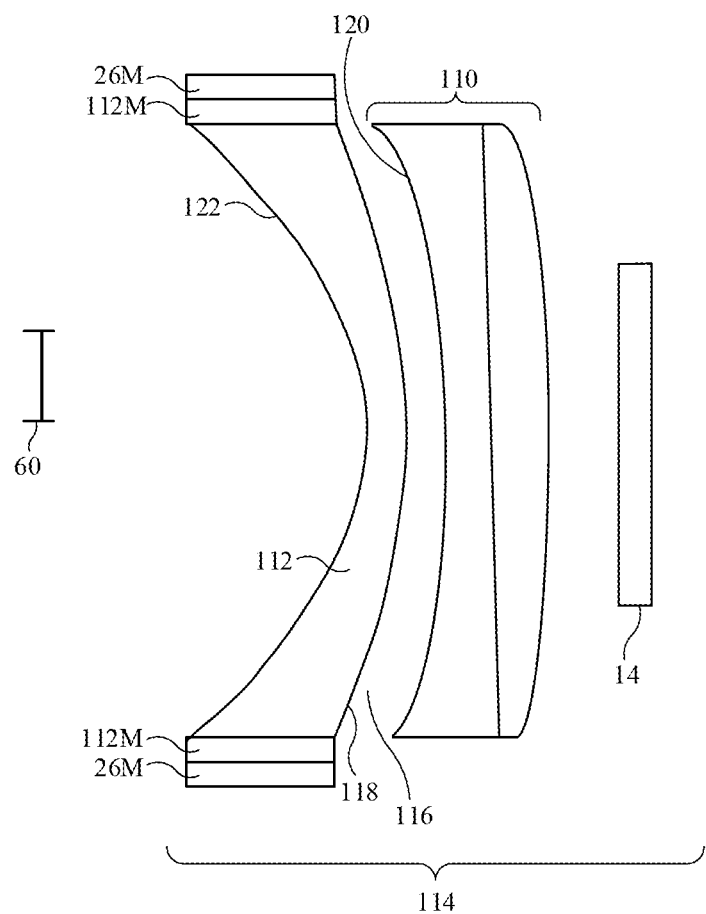
FIG. 13 is a diagram of an illustrative display and optical system for a device such as the head-mounted device of FIG. 11 in accordance with an embodiment.

FIG. 13 is a cross-sectional side view of an illustrative lens system for device 10 of FIG. 11. As shown in FIG. 13, removable lens 112 may have a convex anterior lens surface. Lens 110 may be a catadioptric lens and may have a concave inner surface such as concave surface 120 facing eye box 60. An air gap such as air gap 116 may separate concave surface 120 of lens 110 from convex anterior lens surface 118 of removable lens 112. The size of air gap 116 may be modest (e.g., less than 4 mm, less than 3 mm, less than 2 mm, less than 1 mm, less than 0.5 mm, at least 0.05 mm, or other suitable amount) to help reduce the overall size of system 114. The modest size of air gap 116 may also help expand the field of view for system 114 by allowing posterior surface 122 (e.g., the surface of lens 112 facing eye box 60) to have enhanced curvature. If desired surface 122 and/or surface 118 may be aspheric to reduce lens astigmatism and distortion.

The following terms may sometimes be used in describing the operation of device 10 and system 8.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, organic light-emitting diodes (OLEDs), LEDs, micro-LEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a head-mounted support structure;
a display coupled to the head-mounted support structure that is configured to provide an image containing computer-generated content; and
an optical system that provides the image to an eye box while allowing a real-world object to be viewed through the optical system from the eye box, wherein the optical system includes first and second lenses and an optical coupler through which the real-world object is viewable from the eye box, wherein the optical system includes a waveguide that supplies the image to the optical coupler, wherein the optical coupler supplies the image to the eye box through the first lens, wherein the first lens comprises a removable lens, wherein the first lens is a vision-correction-and-projection-bias lens that has a vision-correction component and a projection bias component, and wherein the second lens is a compensation bias lens that is complementary to the projection bias component and that compensates for the projection bias component.

2. The system defined in claim 1 wherein the second lens is a progressive lens.

3. The system defined in claim 1 wherein the second lens is a bifocal lens.

4. The system defined in claim 1 wherein the second lens has a plurality of regions with a plurality of corresponding lens powers and wherein the projection bias component has a plurality of associated regions with corresponding complementary lens powers.

5. The system defined in claim 1 wherein the vision-correction component is a progressive lens component.

6. The system defined in claim 1 wherein the projection bias component is a positive lens component configured to correct for farsightedness.

7. The system defined in claim 1 wherein the vision-correction component is an asymmetric component configured to correct for astigmatism.

8. The system defined in claim 1 wherein the head-mounted support structure comprises a support structure magnet and wherein the first lens comprises a mating magnet.

9. The system defined in claim 1 wherein the second lens comprises a non-removable lens that is permanently coupled to the head-mounted support structure.

10. The system defined in claim 1 wherein the optical coupler and the waveguide are interposed between the first and second lenses and wherein the first lens has at least first and second regions of different lens powers.

11. The system defined in claim 10 wherein the first region is vertically above the second region when the head-mounted support structure is being worn and wherein the second region has a larger lens power than the first region.

12. A system, comprising:
a head-mounted support structure;
a display coupled to the head-mounted support structure that is configured to provide an image containing computer-generated content; and
an optical system that provides the image to an eye box, wherein the optical system includes a non-removable lens and a removable lens and wherein the removable lens has a convex lens surface facing the non-removable lens and is separated from the non-removable lens by an air gap.

13. The system defined in claim 12 wherein the removable lens has a concave surface opposing the convex lens surface and wherein the concave surface faces the eye box, the removable lens further comprising removable lens coupling structures configured to removably couple the removable lens to the head-mounted support structure.

14. The system defined in claim 12 wherein the removable lens has ring-shaped regions of different lens powers to compensate for field curvature.

15. A system, comprising:
a head-mounted support structure;
a display coupled to the head-mounted support structure that is configured to provide an image containing computer-generated content; and
an optical system that provides the image to an eye box while allowing a real-world object to be viewed through the optical system from the eye box, wherein the optical system includes a waveguide that receives the image and includes an output coupler that couples the image out of the waveguide towards the eye box, wherein the optical system further comprises first, second, and third lenses, the second and third lenses being disposed between the output coupler and the eye box, wherein the output coupler couples the image provided by the display out of the waveguide and to the eye box through the second and third lenses, and wherein the third lens comprises a removable lens.

16. The system defined in claim 15 wherein the second lens comprises a projection bias lens and wherein the first lens comprises a complementary compensation bias lens.

17. The system defined in claim 16 wherein the second lens has at least first and second regions with different lens powers.

18. The system defined in claim 16 wherein the third lens comprises a vision-correction lens.

19. The system defined in claim 16 wherein the second lens has a negative lens power and the first lens has a complementary positive lens power.

* * * * *